United States Patent [19]
Dahnert

[11] Patent Number: 5,417,487
[45] Date of Patent: May 23, 1995

[54] PRESENCE DETECTOR

[75] Inventor: Dean L. Dahnert, Fort Atkinson, Wis.

[73] Assignee: Spacesaver Corporation, Fort Atkinson, Wis.

[21] Appl. No.: 141,809

[22] Filed: Oct. 25, 1993

Related U.S. Application Data

[63] Continuation of Ser. No. 819,827, Jan. 13, 1992, abandoned.

[51] Int. Cl.$^6$ .................................. A47B 88/00
[52] U.S. Cl. ........................... 312/201; 340/567; 250/342; 104/295
[58] Field of Search .............. 312/198, 201; 340/567, 340/573; 367/93; 250/342; 104/295, 303; 105/96, 101

[56] References Cited

U.S. PATENT DOCUMENTS

| | | | |
|---|---|---|---|
| 2,242,303 | 5/1941 | Irmischer | 248/282 X |
| 4,672,206 | 6/1987 | Suzuki et al. | 250/342 |
| 4,783,618 | 11/1988 | Artrip | 312/201 X |
| 5,013,101 | 5/1991 | Muth . | |
| 5,026,990 | 6/1991 | Marman et al. | 250/342 |
| 5,160,190 | 11/1992 | Farrell et al. | 312/201 |

OTHER PUBLICATIONS

ATO ATOCHEM Sensors, Inc. Data Sheets and Literature, ATOCHEM Sensors, Inc., Valley Forge, Pa.

*Primary Examiner*—Brian K. Green
*Attorney, Agent, or Firm*—Ryan, Kees & Hohenfeldt

[57] ABSTRACT

A presence detector for detecting the presence of a heat source, including a motion detector having a predetermined field of view. The motion detector is activated by movement of a heat source a certain minimum amount within that predetermined field of view. An actuator is provided for moving the motion detector sufficient to change the position of the field of view by at least that minimum amount. The actuator includes a shape memory alloy wire. The motion detector is movably or rotatably mounted to a support. The actuator is connected at one end to the motion detector and at the other to the support. The actuator also includes a biasing or return spring for re-stretching the shape memory alloy wire back to its original length once it has contracted. A strain relief spring is also provided, having a spring rate substantially higher than that of the return spring, for relieving strain on the shape memory alloy wire in case the detector rotatable mounting seizes or otherwise is prevented from moving freely.

15 Claims, 1 Drawing Sheet

PRESENCE DETECTOR

This is a continuation of application Ser. No. 07/819,827 filed on Jan. 13, 1992, now abandoned.

BACKGROUND OF THE INVENTION

This invention relates to motion detectors, and in particular to the use of motion detectors to prevent injuries from occurring in connection with mobile storage units.

Mobile storage systems are widely used and well known to comprise a series of storage units which have shelves or bins, for example. Except for one or both of the end units, which may be stationary, each of the storage units will normally be movable, such as on rails, to create an access aisle between two of the units. As this aisle opens, the other units are positioned in close side-by-side relationship to minimize the overall floor space required for the units, moving together to do so. Especially in larger mobile storage units and systems, the carriages can be quite large, and the loads they carry quite heavy, such as steel or construction materials. It is necessary, therefore, to provide motorized means for moving the units. These motorized moving means in turn require the use of means for preventing adjacent units from moving together when a person or other living thing is positioned between them, so as to avoid injury or damage.

In the past it has been customary to provide a sweep or safety switch bar for notifying the control system to inhibit motion of a storage unit if the bar encounters an obstacle or impediment to movement, as shown for instance in U.S. Pat. Nos. 4,743,078 and 4,733,923, both invented by the same inventor as the present application. When such a structure is used alone to protect a person, however, the requirement of physical contact with the bar can be disconcerting and startling, which can make use of this structure alone undesirable. Use of a photoelectric sweep, as disclosed in co-pending application Ser. No. 07/697,307, filed May 8, 1991, now allowed, is only slightly less disconcerting, as the moving storage unit must still move quite close to a person before its motion is interrupted.

Another alternative is to use a "safety floor", such as set forth in U.S. Pat. Nos. 4,744,307 and 4,693,184, which disclose constructions of floor panels including safety switches. A person's weight on one of the floor panels activates one of the safety switches, which notifies the control system to inhibit movement of the storage units. While these units work very well from a safety standpoint, they can be rather expensive, resulting in their non-use in certain situations. And U.S. Pat. No. 4,745,516 even discloses the use of a safety sweep and a safety floor in combination.

Another safety device to be considered is a motion sensor positioned on the carriage, so that the movement of a person between the mobile storage units can be detected and the storage units deactivated. So as not to react to the movement of the storage units themselves, the type of motion sensor activated by a person's body heat should be used. To date, however, such motion sensors deactivate themselves as soon as a person has ceased to move, which does not necessarily mean that the person is no longer between the storage units. The person may simply have temporarily paused, such as to read something on one of the shelves.

This invention relates to improvements to the structure set forth above, and to solutions to some of the problems raised or not solved thereby.

SUMMARY OF THE INVENTION

The present invention constitutes an improvement in the implementation of a motion detector. As indicated above, by their nature motion detectors are limited to detecting motion, and will not detect a stationary body, even if it is giving off a substantial thermal signal. It is an object of the present invention to solve this problem by continuously moving the motion sensor with respect to the area to be sensed. That way, if there is a stationary heat source present in the area, such as a person in the aisle reading a label or file, that source will continue to be sensed.

This solution to the problem carries with it its own problems, though. Most well known sources of movement, such as small motors, solenoids, and linear actuators such as air cylinders or hydraulic cylinders, bring with them substantial amounts of mechanical noise, sufficient noise in fact to activate the sensor alone, without the presence of any heat source. The present invention therefore provides for a means for moving the sensor with the capability of operating at ultra low noise levels.

In particular, the invention provides a presence detector for detecting the presence of a heat source, including a motion detector having a predetermined field of view. The motion detector is activated by movement of a heat source a certain minimum amount within that predetermined field of view. Means are provided for moving the motion detector sufficient to change the position of the field of view by at least that minimum amount. In its preferred embodiment the moving means of the invention comprises an actuator formed of a shape memory alloy wire. The motion detector is movably or rotatably mounted to a support. The actuator is connected at one end to the motion detector and at the other to the support. The actuator includes biasing means for re-stretching the shape memory alloy wire once it has contracted, and strain relief means for relieving strain on the shape memory alloy wire.

Other objects and advantages of the invention will become apparent hereinafter.

DESCRIPTION OF THE PREFERRED EMBODIMENTS

Figure 1:
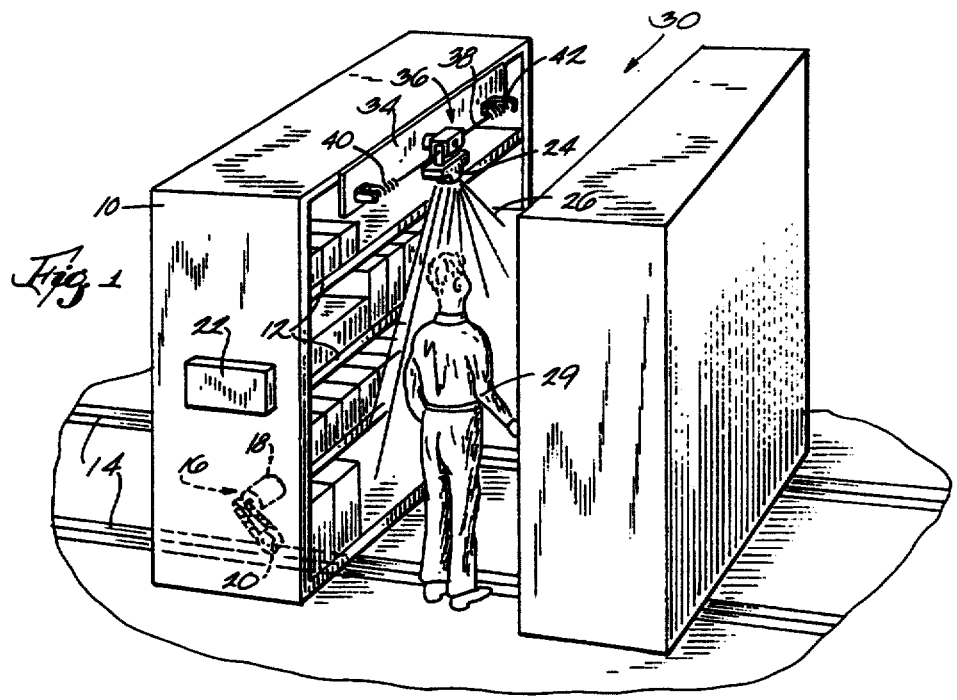
FIG. 1 is a perspective view of a mobile storage system including a presence detector constructed according to a preferred embodiment of the invention.

Referring now to FIG. 1, there is shown a mobile storage unit 10, including several shelves 12. The storage unit 10 is moved along a set of rails 14 by a prime mover 16, such as an electric motor 18 connected to a drive wheel 20 which runs along at least one of the rails. A control system 22 is conventionally provided for determining the rate and direction of movement of the motor 18 and drive wheel 20, and also for determining whether it is safe for the storage unit 10 to move at all. As indicated earlier, it is conventional for any safety sweep and/or safety floor (not shown) to be connected to this control system 22, so as to provide information to make the determination of whether it is safe to move.

According to the invention, a motion detector 24 is provided, which has a predetermined field of view 26. One such motion detector 24 is shown on a larger scale in FIGS. 2 and 3. Applicant has found that a suitable motion detector for this purpose is Model No. PIRM180-200 from Atochem Sensors, Inc. As one can see from FIGS. 2 and 3, such a motion detector 24 will have a plurality of "beams" or regions 28 within its field of view 26. While the vendor uses the term "beams" to describe these regions, that term is inaccurate because the detector is a passive device, and does not send any signal into these regions. They are merely areas or regions of space with reference to the detector 24, and the detector is activated when a heat source moves into or out of any one or more regions with respect to the detector. Hence the distance between similar edges, such as the front edges or the left edges, of adjacent regions is the minimum amount a heat source must move to be sure to be detected. The more regions a detector has, the higher the resolution of the detector and the smaller the minimum amount of movement necessary to activate the detector.

The problem of course with using such a motion detector 24 to detect whether or not a person 29 is in the aisle 30 between two mobile storage units 10 is that the detector only generates a signal when the heat source, or person, enters or leaves one of the regions, including when the person moves from one region to another. If the person stands still for a moment, such as when reading a label or a portion of a book or file taken from one of the shelves, the signal from the detector will be discontinued, after a predetermined time constant. The time constant can be extended to a certain extent, but sooner or later the time constant will come to an end, and there is still no guarantee that the person has left the aisle.

To solve this problem the invention calls for mounting the detector such that it is movable with respect to the aisle, or other area to be detected, and includes means for continuously moving the detector. Since the detector is kept in constant motion, as long as a heat source such as a person exists in its field of view, the detector will continue to be activated. Since the detector 24 is thermally activated, the motion of the detector with respect to the storage unit 10 itself will not activate the detector, because the storage unit will normally be at room temperature.

While the mounting may be any suitable movable mounting, the figures show a mounting that is pivotable, rotating on a pivot axis or axle 32. In the embodiment shown in FIG. 1, where the presence detector is applied to a mobile storage unit 10, the axis 32 is mounted to a suitable support, such as support plate 34, in turn attached to the storage unit.

The means for moving the detector 24 present another problem, and that is that these detectors are inherently very sensitive to physical interference, such as mechanical vibration. The means for moving the detector must therefore have the characteristic of producing extremely little mechanical noise. Applicant has found that the most common types of mechanical moving means, such as air cylinders, hydraulic cylinders, solenoids, or small motors, cause too much mechanical vibration, with the result that the detector is falsely activated by the moving means, regardless of the presence or absence of any heat source in the field of view of the detector. Applicant has found, though, that a suitably silent movement is provided by a prime mover including an actuator 36 that includes a shape memory alloy wire 38.

A shape memory alloy has the property that as it is heated to a predetermined extent, it shrinks in length (and correspondingly increases in diameter, to maintain the same volume) by a known amount. This heat may be provided by any suitable means, such as passing a current through the wire. When the heat is removed, the wire may be stretched back to its original length by application of a certain force. If the molecular structure of the wire is properly designed and manufactured, the length of the wire may be cycled in this manner numerous times without any substantial change in this property. A suitable wire for the purposes of the present invention is sold under the tradename FLEXINOL TM by Dynalloy, Inc. This wire can shrink up to three to five percent of its length by applications of temperatures from 70° C. to 90° C. and return to its full length by application of forces from 5,000 to 15,000 psi.

Figure 2:
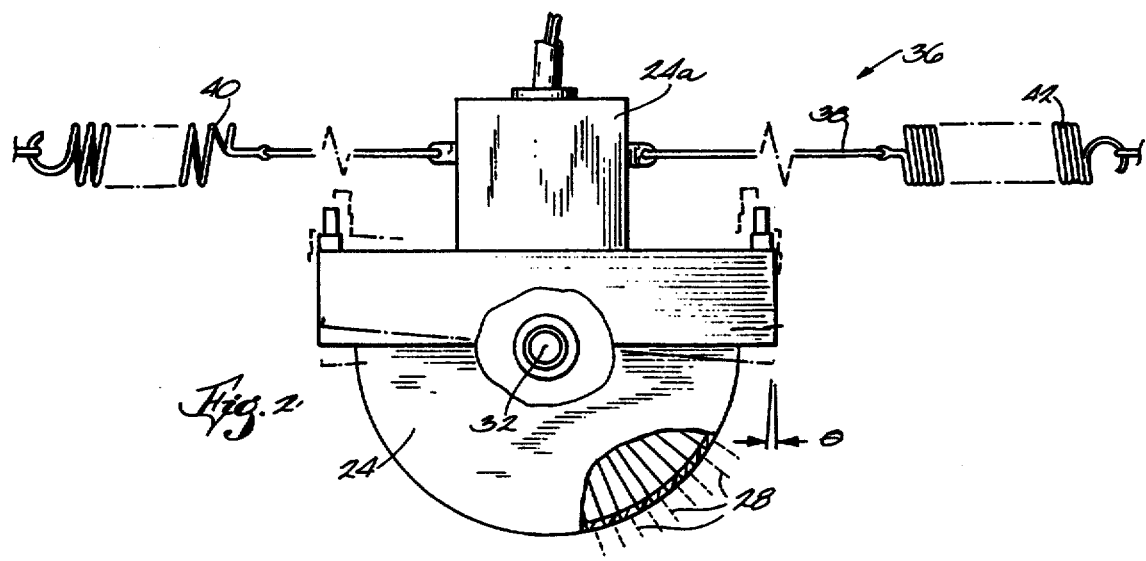
FIG. 2 is a top view, partially cut away, of a presence detector constructed according to a preferred embodiment of the invention.
Figure 3:
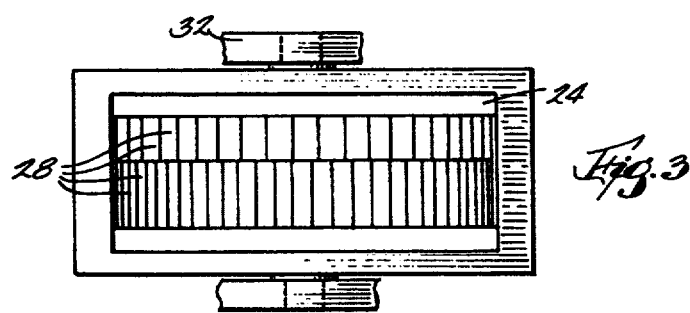
FIG. 3 is a front view of the presence detector shown in FIG. 2.

In the most preferred embodiment, as can be seen by comparing FIGS. 1 and 2, an offset portion 24a of the detector 24 is provided, offset from the axle 32 so as to constitute a lever arm. A shape memory alloy wire 38 is attached at one end to the offset portion 24a, and at the other end to the support means, such as the support plate 34, to which the axle 32 is attached. Thus when the shape memory alloy wire 38 is heated, the detector 24 is rotated in one direction. A biasing means, such as a return spring 40, is provided, connected between the detector 24 and the support plate 34, on the opposite side of the detector from the wire 38. This return spring 40 is chosen to apply sufficient force, when the wire is permitted to cool, to stretch the wire 38 back to its original length, without overstretching and damaging the wire.

If the current is alternately applied to the wire 38 and then stopped, at a frequency of about once per second, the detector 24 will continually sweep its field of view 26 at that pace. Assuming the offset portion 24a is formed and the attachment of the wire selected properly, the regions 28 will move sufficiently that any heat source in the field of view will continue to move from one region to another with respect to the detector, and thus continually activate the detector 24 even if the heat source itself does not move. In the case of the Model No. PIRM180-200 from Atochem Sensors, Inc., referred to above, a pivot angle $\theta$ of about five degrees would be sufficient.

Strain relief is provided by a second or relief spring 42, connected with the wire 38 between the detector 24 and the support 34. This relief spring 42 is provided so as to relieve the strain on the wire 38 in the event the detector 24 is for some reason not permitted to rotate with respect to the support 34, for instance if the axle 32 is seized with respect to the support or if it would otherwise become caught.

The relationship between the spring rates of the return spring 40 and the relief spring 42 will be made even clearer by an example. Assuming that the wire 38 is about three mils in diameter and about four to five inches long, on heating the length of the wire will contract by about 0.14 to 0.15 inches. The return spring 40 is then selected with a spring rate so as to exert, at that amount of stretch of the spring, a force of about 30 to 40 grams. On cooling of the wire 38, this amount of force will easily return the wire to its original length for millions of cycles. Relief spring 42 is preferably chosen with a spring rate substantially higher that of return spring 40. Thus in case the axle 32 is seized or the detector 24 is otherwise prevented from rotating when the wire 38 contracts, relief spring 42 is preferably chosen so as to exert a force of about 80 to 90 grams when the wire has contracted the same 0.140 to 0.150 inches referred to above. Even at this higher level of force the wire 38 will return to its original length for millions of cycles without any substantial change in its characteristics. But relief spring 42 will be substantially inactive as long as the detector 24 is permitted to move, because of the lower spring rate of the return spring 40.

For purposes of clarity of description of the use and application of this invention, the structure has been described with particular reference to a mobile storage unit. The invention has equal applicability, though, to any situation where there is a necessity to detect the presence of a heat source by means of a motion detector, but where the heat source may not necessarily be in continuous motion.

While the apparatus hereinbefore described is effectively adapted to fulfill the aforesaid objects, it is to be understood that the invention is not intended to be limited to the specific preferred embodiment of presence detector set forth above. Rather, it is to be taken as including all reasonable equivalents within the scope of the following claims.

I claim:

1. A detector for detecting the presence of a heat source, comprising:
   a motion detector having a predetermined field of view, said detector activated by movement of a heat source a certain minimum amount within said field of view; and
   a support to which said motion detector is movably mounted;
   means for moving said motion detector sufficient to change the position of said field of view by at least said minimum amount;
   wherein said moving means comprises an actuator formed of a shape memory alloy wire.

2. A detector as recited in claim 1 wherein said actuator has two ends, one connected to said motion detector and the other connected to said support.

3. A detector as recited in claim 2 wherein said actuator further comprises biasing means for restretching said shape memory alloy wire once it has contracted.

4. A detector as recited in claim 2 wherein said actuator further comprises strain relief means for relieving strain on said shape memory alloy wire.

5. In a mobile storage system including at least one movable shelving unit with a wheel and prime mover adapted to move the shelving unit along a path of movement, a presence detector for detecting the presence of a person or other heat source in the path of movement of the shelving unit and discontinuing movement of the shelving unit while the person or other heat source is in the path of movement, said presence detector comprising:
   a motion detector having a predetermined field of view, said detector activated by movement of a heat source a certain minimum amount within said field of view, and not activated by said shelving unit, said motion detector mounted and positioned on the shelving unit so that said field of view includes the path of movement of the shelving unit; and
   mechanically actuated means for repetitively moving said motion detector with respect to said shelving unit sufficient to change the position of said field of view by at least said minimum amount.

6. A detector as recited in claim 5 wherein said moving means comprises a prime mover having extremely low mechanical noise.

7. A detector as recited in claim 5 further comprising a support to which said motion detector is movably mounted.

8. A detector as recited in claim 7 wherein said motion detector is rotatably mounted to said support.

9. In a mobile storage system including at least one movable shelving unit with a wheel and prime mover adapted to move the shelving unit along a path of movement, a presence detector for detecting the presence of a person or other heat source in the path of movement of the shelving unit and discontinuing movement of the shelving unit while the person or other heat source is in the path of movement, said presence detector comprising:
   a motion detector having a predetermined field of view, said detector activated by movement of a heat source a certain minimum amount within said field of view, and not activated by said shelving unit, said motion detector mounted and positioned on said storage system so that said field of view includes the path of movement of the shelving unit; and
   means for moving said motion detector sufficient to change the position of said field of view by at least said minimum amount;
   wherein said moving means comprises an actuator formed of a shape memory alloy wire.

10. A detector as recited in claim 9 further comprising a support to which said motion detector is movably mounted, and wherein said actuator has two ends, one connected to said motion detector and the other connected to said support.

11. A detector as recited in claim 10 wherein said actuator further comprises biasing means for re-stretching said shape memory alloy wire once it has contracted.

12. A detector as recited in claim 10 wherein said actuator further comprises strain relief means for relieving strain on said shape memory alloy wire.

13. A method for detecting the presence of a heat source, comprising:
   movably attaching a motion detector having a predetermined field of view to a support, said detector activated by movement of a heat source a certain minimum amount within said field of view; and
   moving said motion detector sufficiently to change the position of said field of view by at least said minimum amount;
   said moving step comprising moving said motion detector by means of an actuator formed of a shape memory alloy wire.

14. A method as recited in claim 13 wherein said moving step comprises connecting one end of said wire to said motion detector and the other end to said support, and alternately passing current through the wire to increase the temperature of the wire, and stopping the current from flowing through said wire to permit it to cool.

15. A method as recited in claim 14 wherein said moving step further comprises re-stretching said shape memory alloy wire once it has contracted and after it has begun to cool.

* * * * *